June 8, 1954

J. D. McKELLAR 2,680,581

ELEVATOR CONTROL RATIO CHANGER

Filed Aug. 3, 1951

INVENTOR:
John D. McKellar
By Herbert E. Metcalf
His Patent Attorney

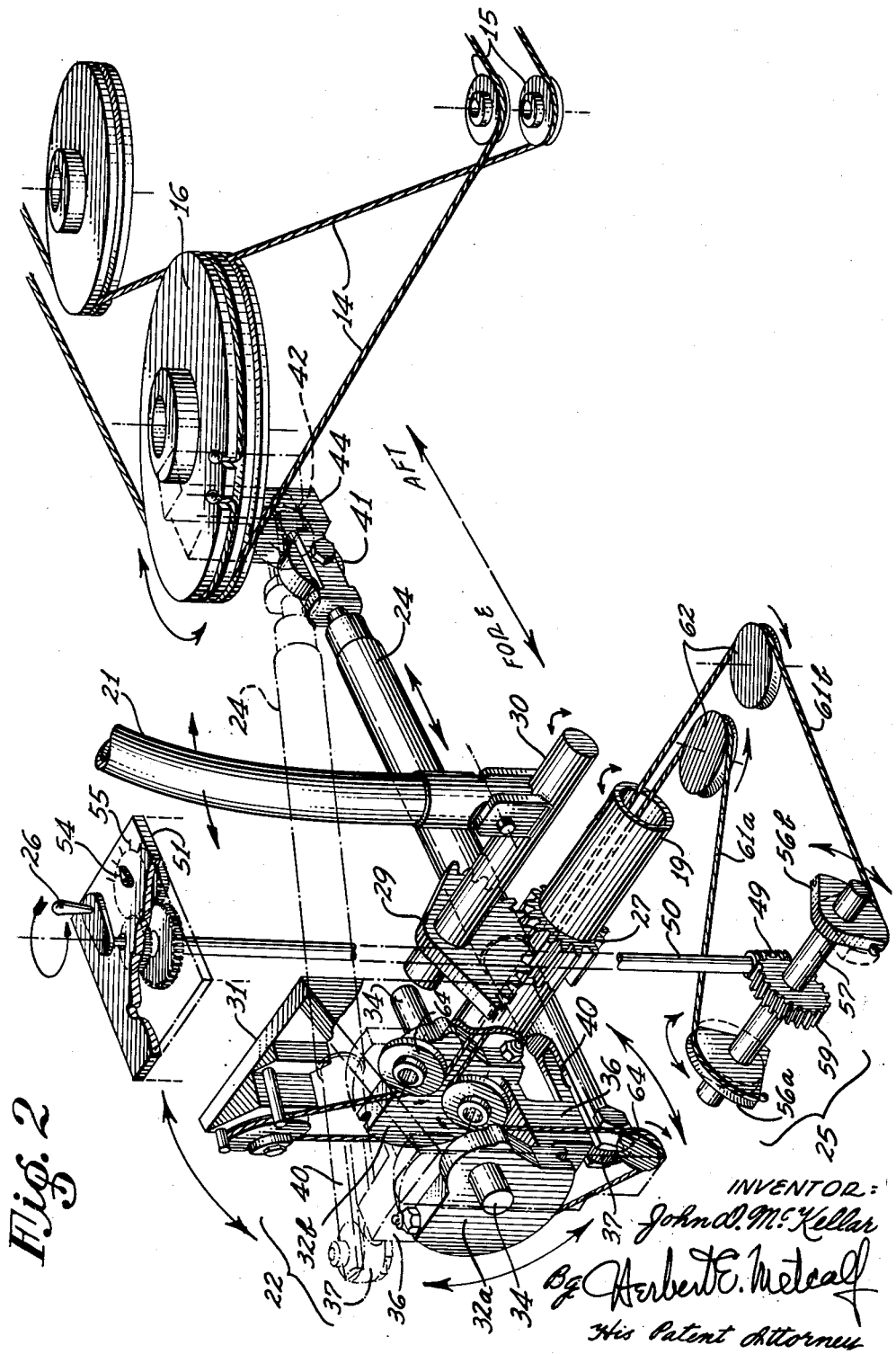

Patented June 8, 1954

2,680,581

UNITED STATES PATENT OFFICE 2,680,581

ELEVATOR CONTROL RATIO CHANGER

John D. McKellar, Los Angeles, Calif., assignor to Northrop Aircraft, Inc., Hawthorne, Calif., a corporation of California Application August 3, 1951, Serial No. 240,140

4 Claims. (Cl. 244—83)

The present invention relates to aircraft attitude controls, and more particularly, to a means for changing the ratio of motion between the control stick and a control surface of an aircraft.

In the attitude control systems of most conventional aircraft, a control column or stick is usually connected to move certain control surfaces to control the attitude of the aircraft in flight, as is well known in the art. Elevators for example, which control the aircraft in pitch or climb, are normally connected to the control stick in such a manner that the ratio of stick motion to the movement of the connected control surface is a fixed value.

Elevator surfaces generally require a relatively large travel or swing to provide satisfactory landing control characteristics at normal landing speeds. However, in current high speed aircraft, the ratio of top speed to landing speed is so great that comparatively small movements of the control stick, to move the elevator under high speed flight conditions, are sufficient to produce relatively large aerodynamic responses. It has been found, therefore, that an aircraft having a proper control surface travel at low speeds tends to become oversensitive to elevator control at high speeds, inasmuch as small movements of the elevator to produce large aerodynamic responses, correspond to extremely small control stick movements when the aircraft is flying at high speed.

One object of the present invention is to provide a means whereby the pilot of an aircraft can change the ratio of motion between the control stick and a connected control surface in accordance with the approximate airspeed of the aircraft, in order to produce a finer control increment at higher speeds.

Other objects of the present invention will become apparent as the disclosure continues.

Briefly, the present invention, in one preferred form, comprises a shaft, mounted in an aircraft attitude control system intermediate the control stick and a control surface, which is connected to rotate in accordance with movement of the control stick. A ratio lever is mounted at one end of the shaft and is movable therewith over an arc at right angles to the long axis of the shaft in accordance with the rotation thereof. The ratio lever is also pivotally mounted to be moved over an arc in a plane parallel to the long axis of the shaft and brought to rest in any desired position between a position where the long axis of the ratio lever is perpendicular to the long axis of the shaft, and a position where the long axis of the ratio lever is nearly parallel with the shaft.

A control rod is positioned to extend generally at right angles to the shaft and is pivotally connected at one end thereof to the ratio lever, the other end thereof being connected to move the control surface. As the shaft is rotated, in accordance with movement of the control stick, the ratio lever is moved over the arc at right angles to the axis of the shaft to longitudinally reciprocate the control rod to move the control surface.

A driving means is provided near the pilot for controlling the position of the ratio lever in the plane which is parallel of the long axis of the shaft. When the ratio lever is moved from a position where the long axis of the ratio lever is perpendicular to the axis of the shaft for example, to a new position where the axis of the ratio lever is nearly parallel with the shaft, the end of the ratio lever connected to said control rod is moved over an arc having a much shorter radius than the arc of the first position, resulting in proportionately shorter strokes of the control rod.

A range of ratio lever positions is empirically determined and relative graduations, in accordance therewith, are calibrated on a dial which is positioned in a gear box. An indicator is cooperatively connected with the driving means which is also mounted in the gear box. As the driving means is actuated to move the ratio lever to a desired position, the indicator relatively moves therewith, over the calibrated ratio dial to indicate the ratio lever setting. The pilot of the aircraft can, thereby, accurately change the position of the ratio lever in accordance with the indicated airspeed to achieve the proper ratio of motion between the control stick and the connected attitude control surface as desired.

The present invention will be more clearly understood by reference to the accompanying drawings wherein:

Figure 2 is a diagrammatic view in perspective of the motion ratio changer assembly shown in Figure 1 with part of the structure cut away. Supporting structure and shaft bearings have been omitted for clarity.

Figure 1:
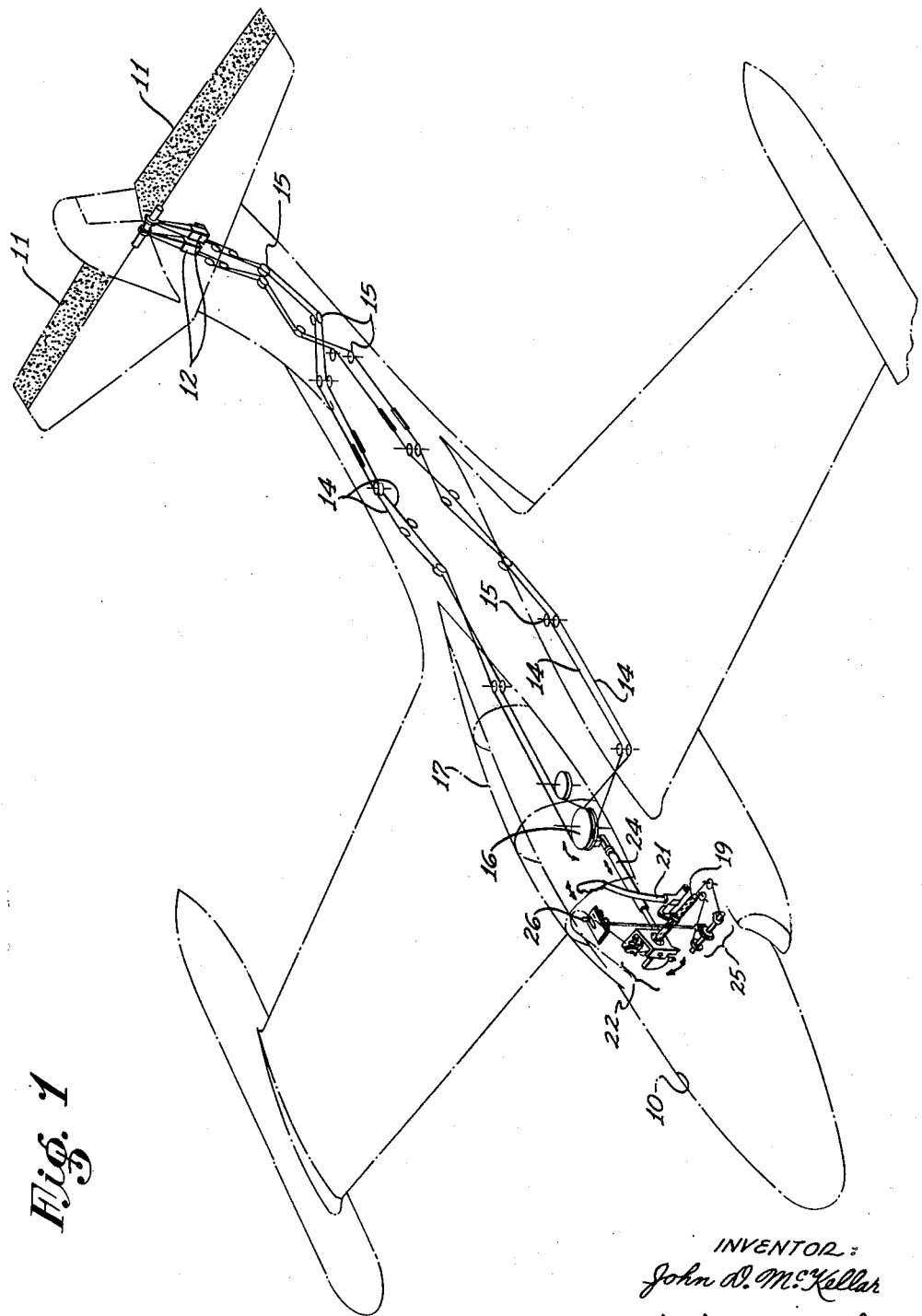
Figure 1 is a diagrammatic view, in perspective, of an aircraft showing one embodiment of the present invention connected into the elevator control system.

Referring first to Figure 1 for a general description of the present invention is one preferred form; an aircraft 10 has two elevators 11 which are operated as a single unit by two cable controlled power actuators 12. Each actuator 12 is connected by a control cable 14, which is routed around a number of idler pulleys 15, to a double quadrant 16, which is mounted with the axis of rotation thereof vertical to the center line of the aircraft 10, beneath the floor of the cockpit 17.

An output shaft 19 is gear driven to rotate in either direction in accordance with forward and rearward movement of a control stick 21. A motion ratio changing lever assembly 22, which will be later described in detail, is mounted to rotate with the output shaft 19 to reciprocate a control rod 24, one end of which is connected thereto. The other end of the control rod 24 is pivotally connected to operate the double quadrant 16.

The motion ratio lever assembly 22 is actuated by a cable and quadrant system 25 driven by a crank 26 which is mounted in the cockpit 17, within easy reach of the pilot (not shown) of the aircraft 10.

The motion ratio arm assembly 22 in one preferred form, is constructed as shown in Figure 2, wherein the output shaft 19, preferably made from hollow tubing, carries an external drive gear 27 which is meshed with a sector gear 29 mounted on a stick shaft 30 to which the control stick 21 is also mounted in the usual manner. The output shaft 19 is rotated about a fixed axis by fore and aft movement of the control stick 21; the ratio between the sector gear 29 and the output shaft drive gear 27 providing a greater motion of the output shaft 19 than the stick shaft 30 by a predetermined amount.

The ratio arm assembly 22 is preferably fixed at one end of the output shaft 19 and comprises a yoke member 31 mounted to the output shaft 19, a pair of lever quadrants 32a and 32b pivotally mounted to be rotated about a pair of fixed pivots 34 which are mounted opposite each other in the yoke 31, and a ratio lever 36 which is mounted between the quadrants 32a and 32b, or made integral therewith, and having an axial bore extending longitudinally therethrough in which a swivel fitting 37 is swivelly retained.

The control rod 24 is connected by a bifurcated end 40 thereof, to the swivel fitting 37 of the ratio arm 36 and is swivelly connected at the other end thereof, to a swivel type fitting 41 which is swivelly retained in a bore 42 which extends laterally through a post member 44 mounted at a predetermined point adjacent to the outer edge of the double quadrant 16, and on the underside thereof. The control rod 24 is actuated with a push-pull movement by the ratio arm 36 to rotate the double quadrant 16 in either radial direction about its axis, in accordance with rotation of the output shaft 19 in response to fore and aft movement of the control stick 21. In this manner, the double quadrant 16 operates the cables 14 mounted thereon, to operate the control surface actuators 12 as shown in Figure 1.

The ratio arm 36, is made capable of controlled angular movement in a plane parallel to the longitudinal axis of output shaft 19, by quadrants 32a and 32b which are positioned on each side thereof and mounted thereto, and can be moved to any desired position between a position where the longitudinal axis of the arm 36 is substantially perpendicular to the longitudinal axis of the output shaft 19 as shown, and a position where the longitudinal axis of the arm 36 is more nearly parallel with the output shaft 19, as indicated in the broken line drawing of Figure 2.

Control of the angular movement of the arm 36 is accomplished by actuation of the quadrant and cable system 25 which can be driven by a worm gear 49, for example, mounted at one end of a drive shaft 50 which extends upwardly into a gear box 51 mounted in the cockpit (not shown). The drive shaft 50 is geared to be rotated by the ratio crank 26, which is also mounted in the gear box 51. An indicator 54 is gear driven by the drive shaft to move over a calibrated dial 55 which is mounted to the gear box 50 and positioned within full view of the pilot to indicate the approximate angular position of the ratio arm 36.

Input quadrants 56a and 56b are mounted on each end of a rotatable shaft 57 which has a gear 59 mounted thereon meshing with the worm gear 49. The shaft 57 is rotated in accordance with rotation of the ratio crank 26. A pair of cables 61a and 61b are mounted, in the customary manner, to the input quadrants 56a and 56b respectively and routed around guide pulleys 62 to pass through the hollow output shaft 19, emerging from the opposite end thereof to be routed around other guide pulleys 64 to be connected to the lever quadrants 32a and 32b respectively. One cable 61a is mounted to its corresponding input quadrant 56a in such a manner as to rotate the corresponding ratio lever quadrant 32a, which is connected at the other end thereof, in a counter-clockwise direction. It is apparent that in the rotation of either quadrant 56a or 56b, depending on the direction of rotation of the crank 26, the opposite quadrant will be rotated in a reverse direction thereby.

The relation between the rotation of the output shaft and the angular movement of the end of the ratio arm 36 which is connected to the control rod 24, can now be seen. When the ratio arm 36 is in a position where the longitudinal axis thereof, is substantially perpendicular to the longitudinal axis of the output shaft 19, the end of the ratio arm 36 which is connected to the control rod 24 is moved over an arc having a maximum length radius, whereas when the ratio arm 36 is angularly moved and positioned in a position where the longitudinal axis thereof is at an angle, with respect to the longitudinal axis of the output shaft, of less than 90°, the radius of the arc of the ratio arm 36 is proportionately shortened, with the result that the stroke of the control rod 24 is also proportionately shortened in accordance therewith.

Therefore, as the angle of the ratio arm 36, with respect to the longitudinal axis of the output shaft 19, is decreased in accordance with rotation of the ratio crank 26, the same rotation of the output shaft 19 results in comparatively shorter push-pull movements of the control rod 24 to rotate the double quadrant 16, requiring relatively larger fore and aft movements of the control stick 21 to move the control rod 24 a given distance.

A desired range of ratio change can be readily established, giving the high speed ratio setting a control stick to control surface motion ratio of 8 to 1 for example, graduating the ratio increments, by dial calibrations down to a 1 to 1 motion ratio for the low speed ratio setting.

It can thus be seen the motion ratio changer of the present invention provides a unique means by which the pilot of an aircraft can accurately change the control stick to control surface motion ratio in accordance with the indicated airspeed, which can be quickly and safely regulated while the aircraft is in flight to achieve the proper stick to surface control ratio.

While in order to comply with the statute, the invention has been described in language more or less specific as to structural features, it is to be understood that the invention is not limited to the specific features shown, but that the means and construction herein disclosed comprise the preferred form of putting the invention into ef-

What is claimed is:

1. In an aircraft attitude control system having a control surface connected to respond to relative movement of a control element, means for changing the ratio of said relative movement between said control surface and said control element, comprising a shaft mounted intermediate said control surface and said control element and rotatable in accordance with movement of said control element, a first pair of quadrants, a support member mounted to be rotated in accordance with rotation of said shaft, said quadrants being mounted to pivot around an axis in said support member, said axis being at right angles to the long axis of said shaft, a ratio lever mounted intermediate said quadrants and connected to be moved thereby, said ratio lever being moved over an arc in a plane at right angles to the long axis of said shaft when said shaft is rotated, said ratio arm also being moved over a plane parallel to the long axis of said shaft when said quadrants are pivoted about their axis in said support member, a second pair of quadrants, driving means connected to drive said second pair of quadrants, said second pair of quadrants being cable connected to pivot said first pair of quadrants to move said ratio lever in said plane parallel of the long axis of said shaft, to a predetermined position in said plane parallel to said shaft, position indicating means connected to said driving means to indicate the position of said ratio lever in said plane parallel of said shaft, and a control rod positioned to extend generally at right angles to said shaft, said control rod being pivotally connected at one end thereof to said ratio lever, the other end of said control rod being connected to operate said control surface.

2. In an aircraft attitude control system having a control surface connected to respond to relative movement of a control element, means for changing the ratio of said relative movement between said control surface and said control element, comprising a shaft mounted intermediate said control surface and said control element and rotatable in accordance with movement of said control element, a support member mounted to be rotated in accordance with rotation of said shaft, a first pair of quadrants mounted to be rotated about a fixed axis in said support member, said axis being at right angles to said shaft, a ratio lever mounted intermediate said quadrants and movable therewith over an arc in a plane parallel of the long axis of said shaft between a position where said ratio lever is perpendicular to said shaft and a position where said ratio lever is nearly parallel with said shaft, said ratio lever also being moved over an arc at right angles to said shaft in accordance with rotation thereof, a second pair of quadrants mounted to be rotated, said second pair of quadrants being cable connected to rotate said first pair of quadrants, driving means for rotating said second pair of quadrants, position indicating means cooperating with said driving means to indicate the position of said ratio lever in said plane parallel of said shaft, and a control rod extending generally at right angles to said shaft, said control rod being pivotally connected at one end thereof to said ratio lever, the other end of said control rod being connected to operate said control surface.

3. In an aircraft attitude control system having a control surface connected to respond to relative movement of a control element, a shaft mounted intermediate said control surface and said control element and rotatable in accordance with movement of said control element said shaft having a coaxial bore extending throughout its length, a yoke shaped support member fixedly mounted on one end of said shaft to be rotated in accordance with rotation of said shaft; improved means for changing the ratio of said relative movement between said control surface and said control element, comprising a pair of quadrants mounted between the arm portions of said support member, said quadrants being rotatable about a fixed axis in said support member normal to said shaft, a ratio lever mounted between said quadrants and movable therewith in planes containing the longitudinal axis of said shaft, a pair of cables connected to rotate said quadrants, said cables passing over idler pulleys mounted between the arm portions of said support member and passing through the coaxial bore in said shaft, and a control rod extending generally at right angles to said shaft, said control rod being pivotally connected at one end thereof to said ratio lever, the other end of said control rod being connected to operate said control surface.

4. In an aircraft attitude control system having a control surface connected to respond to relative movement of a control element, means for changing the ratio of said relative movement between said control surface and said control element, comprising a shaft having a coaxial bore throughout its length, said shaft being rotatable in accoradnce with movement of said control element, a yoke shaped support member having arm portions and a connecting portion, said support member being fixedly secured to one end of said shaft with its connecting portion normal thereto, a bore through said connecting portion coaxial with the bore in said shaft, a first pair of quadrants mounted between the arm portions of said support member, said quadrants being rotatable about a fixed axis in said support member normal to said shaft, a ratio lever mounted between said quadrants and movable therewith in planes containing the longitudinal axis of said shaft, a second pair of quadrants rotatably mounted, said second pair of quadrants being cable connected to rotate said first pair of quadrants about their fixed axis, said cables passing over idler pulleys mounted between said arm portions and through said bores in traveling between said first and second pair of quadrants, driving means for rotating said second pair of quadrants, position indicating means cooperating with said driving means to indicate the position of said ratio lever in said plane parallel to said shaft, and a control rod extending generally at right angles to said shaft, said control rod being pivotally connected at one end thereof to said ratio lever, the other end of said control rod being connected to operate said control surface.

References Cited in the file of this patent

UNITED STATES PATENTS

| Number | Name | Date |
|---|---|---|
| 1,776,733 | Kasuboski | Sept. 23, 1930 |
| 2,406,233 | Linnert | Aug. 20, 1946 |

FOREIGN PATENTS

| Number | Country | Date |
|---|---|---|
| 605,642 | Great Britain | July 28, 1948 |